United States Patent [19]
Kidd et al.

[11] Patent Number: 5,274,473
[45] Date of Patent: Dec. 28, 1993

[54] RAPID VARIABLE ANGLE DIGITAL SCREENING

[75] Inventors: Robert C. Kidd, Ann Arbor, Mich.; J. Brett Lefebvre, Lowell, Mass.

[73] Assignee: Intergraph Corporation, Huntsville, Ala.

[21] Appl. No.: 809,032

[22] Filed: Dec. 16, 1991

Related U.S. Application Data

[63] Continuation of Ser. No. 389,835, Aug. 4, 1989.
[51] Int. Cl.$^5$ .......................... H04N 1/40; H04N 1/00
[52] U.S. Cl. .................................. 358/458; 358/460; 358/401
[58] Field of Search ............... 358/401, 429, 443, 448, 358/455, 456, 457, 458, 459, 460, 75, 76, 77, 78, 79, 80

[56] References Cited

U.S. PATENT DOCUMENTS

| | | | |
|---|---|---|---|
| 3,688,033 | 8/1972 | Hell et al. | 178/15 |
| 3,806,641 | 4/1974 | Crooks | 358/283 |
| 3,916,096 | 10/1975 | Everett et al. | 358/283 |
| 3,922,484 | 11/1975 | Keller | 358/283 |
| 3,997,911 | 12/1976 | Perriman et al. | 358/75 |
| 4,012,584 | 3/1977 | Gascoigne | 358/302 |
| 4,051,536 | 9/1977 | Roetling | 358/298 |
| 4,084,183 | 4/1978 | Keller et al. | 358/75 |
| 4,149,194 | 4/1979 | Holladay | 358/460 |
| 4,185,304 | 1/1980 | Holladay | 358/298 |
| 4,193,096 | 3/1980 | Stoffel | 358/260 |
| 4,203,154 | 5/1980 | Lampson et al. | 364/200 |
| 4,214,277 | 7/1980 | Urich | 358/283 |
| 4,245,258 | 1/1981 | Holladay | 358/282 |
| 4,246,614 | 1/1981 | Knox | 358/283 |
| 4,281,312 | 7/1981 | Knudson | 340/146.3 |
| 4,350,996 | 9/1982 | Rosenfeld | 358/75 |
| 4,419,690 | 12/1983 | Hammes | 358/75 |
| 4,447,831 | 5/1984 | Adsett | 358/283 |
| 4,449,150 | 5/1984 | Kato | 358/283 |
| 4,456,924 | 6/1984 | Rosenfeld | 358/75 |
| 4,493,049 | 1/1985 | Donohue et al. | 364/900 |
| 4,499,489 | 2/1985 | Gall et al. | 358/75 |
| 4,532,503 | 7/1985 | Pennebaker | 340/728 |
| 4,547,812 | 10/1985 | Waller et al. | 358/283 |
| 4,606,069 | 8/1986 | Johnsen | 382/56 |
| 4,633,327 | 12/1986 | Roetling | 358/283 |
| 4,647,962 | 3/1987 | Rosen et al. | 358/78 |
| 4,661,859 | 4/1987 | Mailloux et al. | 358/283 |
| 4,667,247 | 5/1987 | Karow | 358/280 |
| 4,692,879 | 9/1987 | Ikuta | 364/518 |
| 4,700,235 | 10/1987 | Gall | 358/283 |
| 4,717,954 | 1/1988 | Fujita et al. | 358/80 |
| 4,727,430 | 2/1988 | Miwa | 358/283 |
| 4,752,822 | 6/1988 | Kawamura | 358/80 |

OTHER PUBLICATIONS

T. M. Hollday, "An Optimum Algorithm for Halftone Generation for Displays and Hard Copies", SID Digest, 1979, pp. 102-103.

D. Kermisch et al, "Fourier Spectrum of Halftone Images", Journal of the Optical Society of America, Jun. 1975, vol. 65, No. 6, pp. 716-723.

P. G. Roetling, "Binary Approximation of Continuous Tone Images", Photographic Science and Engineering, Apr. 1977, vol. 21, No. 2, pp. 60-65.

P. G. Roetling, "Halftone Method with Edge Enhancement and Moire Suppression", Journal of the Optical Society of America, Oct. 1976, vol. 66, No. 10, pp. 985-989.

P. G. Roetling et al, "Tone Reproduction and Screen Design for Pictorial Electrographic Printing", Journal of Applied Photographic Engineering, Fall 1979, vol. 5, No. 4, pp. 179-182.

P. G. Roetling, "Analysis of Detail and Spurious Signals in Halftone Images", Journal of Applied Photographic Engineering, Winter 1977, vol. 3, No. 1 pp. 12-17.

*Primary Examiner*—Edward L. Coles, Sr.
*Assistant Examiner*—Thomas D. Lee
*Attorney, Agent, or Firm*—Bromberg & Sunstein

[57] ABSTRACT

A method for reproducing images using rotated screens, wherein the rotated screens are formed by the replication of a screen tile (ABCD). The screen tile (ABCD) is based on a seed screen cell (11, 17) that is disposed at the desired angle of screen rotation, theta, and is replicated so as to fill the screen tile. Thus, the screen can be generated by replicating the screen tile with respect to the same coordinate system as that identifying addresses for the image data being screened, i.e., without rotating the screen tile. Both the screen tile and the seed screen cell (11, 17) are represented by matrices. Noise (51) can be introduced into process of forming the screen in order to further lessen Moire patterns.

9 Claims, 7 Drawing Sheets

RAPID VARIABLE ANGLE DIGITAL SCREENING

This is a continuation of copending application Ser. No. 07/389,835, filed on Aug. 4, 1989.

TECHNICAL FIELD

The present invention relates to image reproduction, and, more particularly, to the use of digital techniques to achieve rapid production of screen images at variable screen angles.

BACKGROUND ART

Digital screening typically involves superimposing onto digital image data a collection of data representing a screen to produce a digital output that is representative of a screened image. U.S. Pat. No. 4,413,286, issued for an invention of Boston, which is hereby incorporated herein by reference, discloses a digital technique for obtaining a screen image at variable screen angles. The Boston approach in one embodiment involves storing in an array (which there and herein is called a "screen cell" matrix) a series of optical density values representative in each case of the optical density in a specific location within a single screen cell. A given storage address in the array corresponds to a specific location within the screen cell. These values have importance since the screen is formed simply of contiguous repetitions of the screen cell.

In order to reproduce in raster form an image that has been subjected to the screen, Boston begins with the optical density values of the image at address locations identified by reference to a coordinate system, for example, the line number and pixel number of each pixel. The problem is then how to compare each pixel of image data with the optical density in the applicable screen cell location. The problem is nontrivial because the principal axis of the screen does not necessarily coincide with either the line number (i.e., y) axis or the pixel number (i.e., x) axis. Furthermore, the physical size of the screen cell or of the spacing between address locations within the cell for its density data does not generally match the spacing between adjacent pixels or adjacent lines.

Boston teaches that the optical density of the screen at a given set of coordinates of the image data can be determined by computing the pertinent address in the screen cell and accessing the optical density value stored there. Once the screen density at a given set of coordinates of the image data is known, it is a straightforward matter to compare the image pixel density at the same coordinates. Boston further teaches that a method for computing the pertinent screen cell address for each image coordinate is to determine an initial screen cell address for a given image pixel address and thereafter for each increment in pixel number or line number to determine the corresponding increments in the screen cell address coordinates. See column 4, especially lines 35–45.

One embodiment of Boston's invention takes advantage of these teachings by processing image data one pixel at a time, performing the calculation to identify for such pixel the corresponding screen cell address, accessing from the screen cell array the pertinent optical density of the screen, comparing the screen density with the image pixel density, and generating an appropriate output based on the comparison. See column 4, line 45, through column 5, line 34.

The approach of Boston permits screening at any angle and accomplishes it with modest memory requirements (for example, screen cell memory of 256×256 elements or even 64×64 elements). However, the speed of the screening is affected by the time for calculation of screen cell addresses, and the use of screen cell memory in the size and manner described makes difficult the use of some screen frequencies with certain pixel and line frequencies.

U.S. Pat. No. 4,350,996, issued for an invention of Rosenfeld, discloses the addition of a random number to each screen memory address calculation as a way of reducing the Moire pattern. Column 6, lines 6–14. However, there is a problem in that the greater the amount of noise added to the system the less resolution is available in its output.

U.S. Pat. No. 4,149,194, issued for an invention of Holladay, discloses the use of a repetitive rectangular matrix representative of a screen cell in accomplishing the screening. However, the approach taught there apparently requires advance calculation of specific conditions permitting the repetition to occur, because not all screen angles can be accommodated. Column 7, lines 18–36.

SUMMARY OF INVENTION

The present invention provides an improvement to the approach taught by Boston by eliminating the need for calculation of the screen cell addresses during the screening processing. Instead, in a preferred embodiment of the invention, all screen cell address calculations are performed in advance and the necessary data is stored in what is called herein a "screen tile" matrix.

The screen tile matrix is based on a seed screen cell matrix that is predefined just as in the Boston patent. As in the Boston patent, the screen itself is formed simply of contiguous repetitions of the screen cell disposed at some desired angle. However, in the present invention the screen tile is employed. In a preferred embodiment, the screen tile matrix is calculated with respect to the same coordinate system (for example, line number and pixel number) as that identifying addresses for the image data being screened. A screen tile is defined as contiguous replications of the seed screen cell disposed at a predetermined angle; the number of replications occurring along each axis of the coordinate system is the minimum (which may be 1) necessary to cause a corner of the last replication of the seed screen cell to coincide (within a prescribed degree of accuracy) with a relative address on the axis. This relative address on such axis defines the tile's address period for such axis. The screen tile matrix contains, for each address therein given with respect to the image data's coordinate system, the optical density value of the screen at such address.

Because typically the parameters defining the screen tile can be determined prior to the actual screening operation, the screen tile can be calculated in advance and loaded into screen memory prior to commencement of screening. The screening operation is then simplified (in relation to the approach taught by Boston) to systematically accessing screen density and image density values for each pixel in a given address period of each axis and comparing the two values to produce an output value. This process is repeated for all address periods of each axis.

Further embodiments of the invention provide for adding carefully controlled amounts and types of noise to the screen density values so as to minimize Moire patterns.

BRIEF DESCRIPTION OF THE DRAWINGS

The foregoing features of the invention can be more readily understood by reference to the following detailed description given with reference to the accompanying drawings in which.

DETAILED DESCRIPTION OF SPECIFIC EMBODIMENTS

Figure 1:
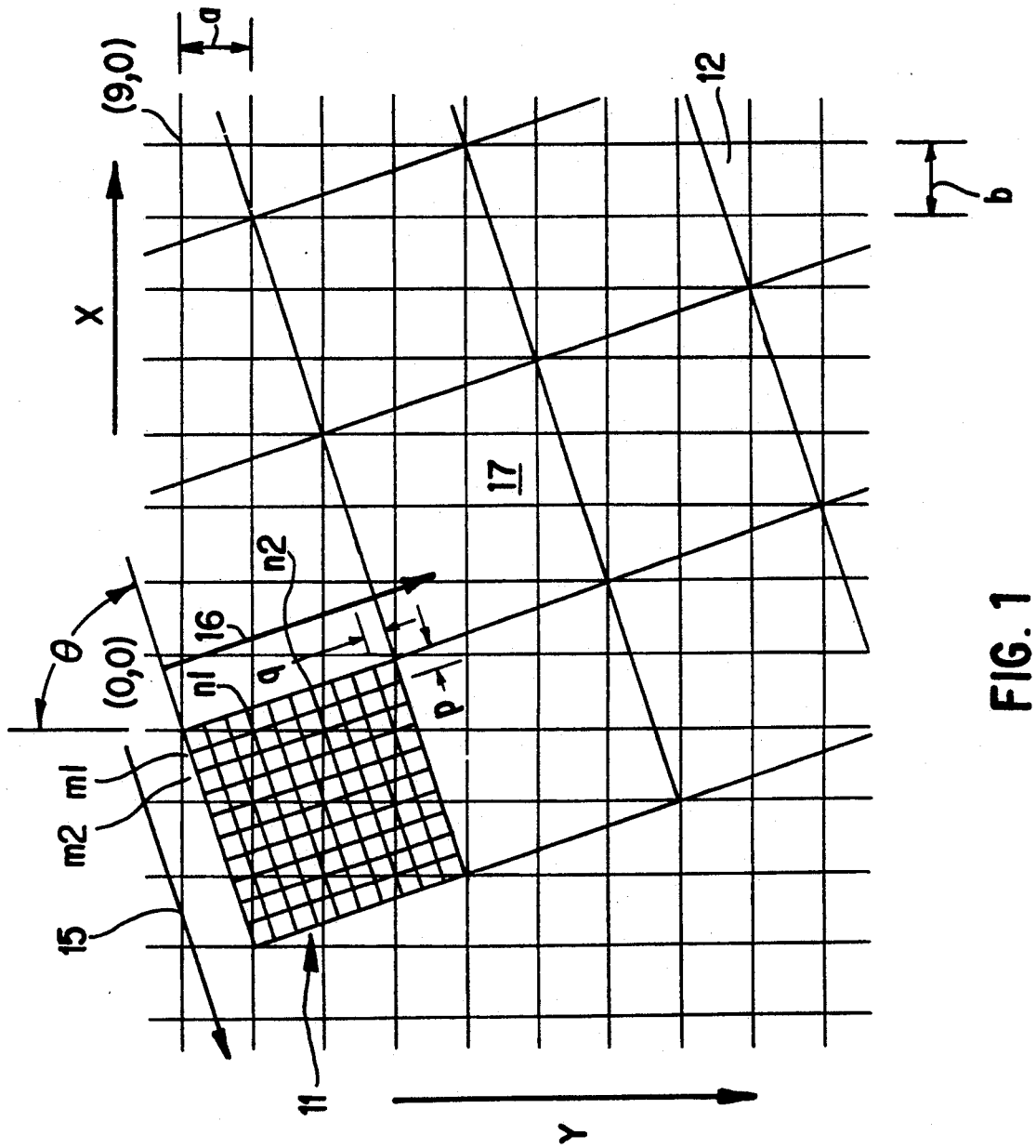
FIG. 1 presents a simplified representation of a portion of screen tile in accordance with a preferred embodiment of the present invention.

In FIG. 1 there is shown in somewhat exaggerated detail the structure of a portion of a screen tile in accordance with a preferred embodiment of the invention. In the figure it is assumed that the X and Y axes are used to describe coordinates of the pixel number and line number respectively of optical density values of pixels of the graphic image to be reproduced. Thus it is assumed that there is a graphic image pixel value at the origin (0,0), another at (0,1), another at (0,2), and so on down the 0th pixel number coordinate. Similarly, graphic image pixel values exist for each intersection of line number coordinate Y and pixel number coordinate X. The spacing of pixels produces a typical parallelogram 12 (which here is square) defined by pixel pairs on adjacent lines and which exhibits the spacing a between pixels in the direction of line number and b in the direction of pixel number.

The tile of FIG. 1 consists of contiguous replications of a seed screen cell 11 disposed at an arbitrarily specified angle theta to the graphic image coordinates. The seed screen cell has a screen optical density value associated with each intersection of its coordinates 15 and 16. Thus the seed screen cell optical density values are referred to by coordinates 15 spaced apart by a distance p defining the width and coordinates 16 spaced apart by a distance q defining the height.

The screen tile of FIG. 1 includes contiguous replications of the seed screen cell 11, exemplified, for example, by item 17. In accordance with the invention, the screen density values in the screen tile are addressed by the X-Y coordinates of the image that is to be reproduced rather than the coordinates 15 and 16 of the seed screen cell itself. As an example, the screen tile includes a screen optical density value associated with the X-Y coordinates 0,1. Because the seed cell is not directly accessible by the X-Y coordinate system, it is necessary to calculate the seed cell address corresponding to X=0, Y=1, in accordance with the equations described in the Boston patent. As shown in FIG. 1, the seed cell coordinates at the intersection of m1 and n1 are closest to X=0, Y=1, and accordingly the value at those seed cell coordinates is the value stored in the screen tile for (0,1). Similarly, the value stored in the screen tile for X=0, Y=2 is accessed by seed cell coordinates at the intersection of m2 and n2. In this manner the screen tile may be filled with screen optical density values accessed by X-Y coordinates over the period of the screen tile.

Figure 2:
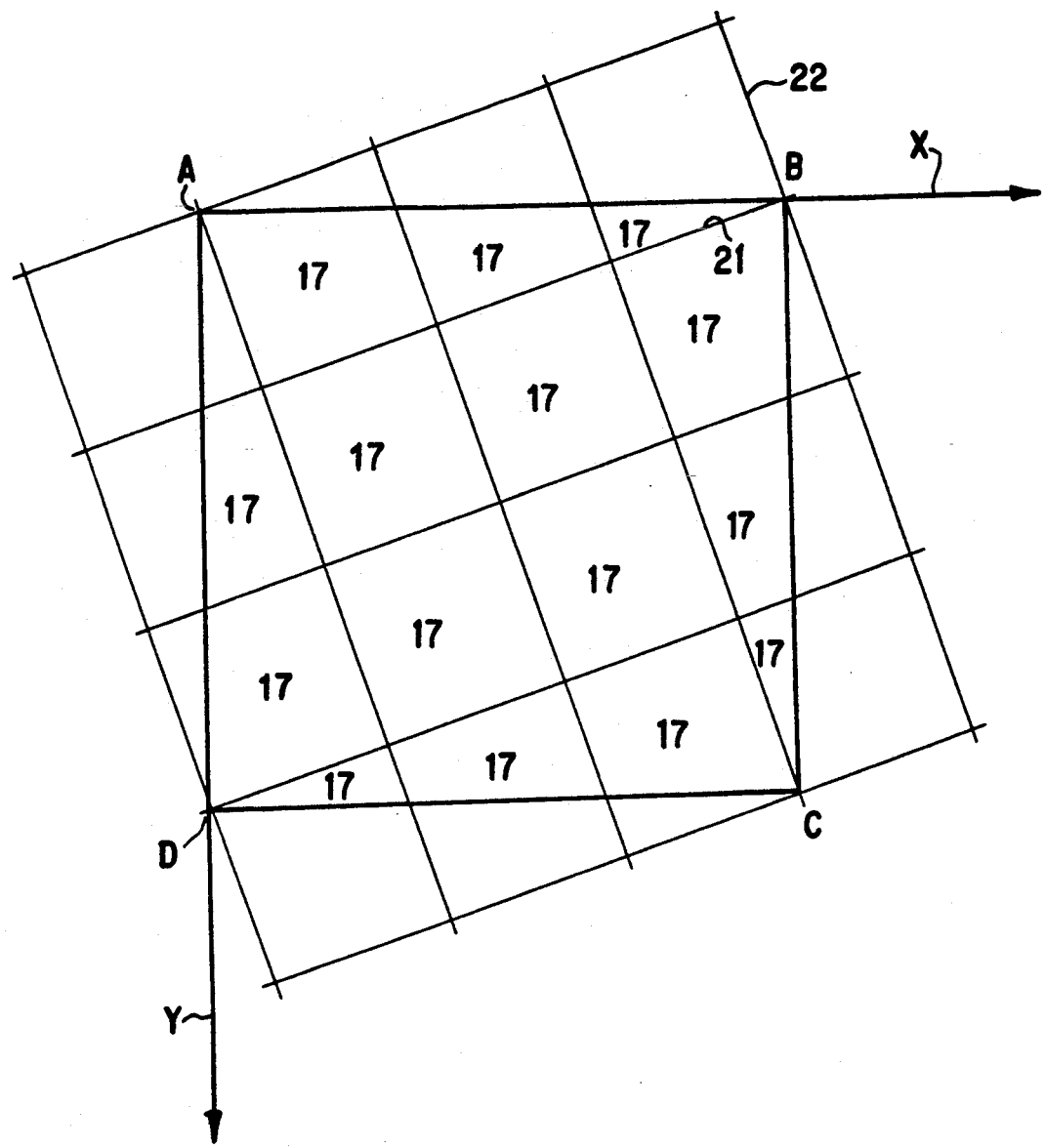
FIG. 2 shows boundaries of the screen tile of FIG. 1.

The boundaries of the screen tile of FIG. 1 are defined by points ABCD in FIG. 2. It can be seen in FIG. 2 that the corner B defined by the intersection of screen cell boundary coordinates 21 and 22 is deemed close enough (typically within a fraction of a pixel spacing) to the adjacent image pixel location on the X axis as to permit the fixing of the screen tile's right-hand boundary at point B on the X axis. Point B is the first occurrence of the satisfaction of this condition, and thus the distance AB defines the period of the screen tile on the X axis. Similarly point D is the first satisfaction of the condition on the Y axis.

It can be discerned on examination of FIGS. 1 and 2, that in instances where theta has a rational tangent, that is when tan theta = M/N, M and N integers, a border of a screen cell will exactly coincide with the X axis at coordinate (N,O) and with the Y axis at coordinate (O,M). Screen angles having rational tangents are simply individual instances for handling in accordance with the invention and require no special processing. In instances where the screen tile matrix is at least 512×512, it has been found that the effect of "rounding" to the nearest period on each axis to enable the screen tile to fit the matrix produces a small error manifested only in a very slight change in the average dot frequency with respect to that desired.

It will be appreciated that even when theta does not have a rational tangent, the angle of screen rotation actually produced by the present invention will have a rational tangent. The invention effectively rotates the screen to the angle having a rational tangent that is closest to the desired angle theta.

Figure 3:
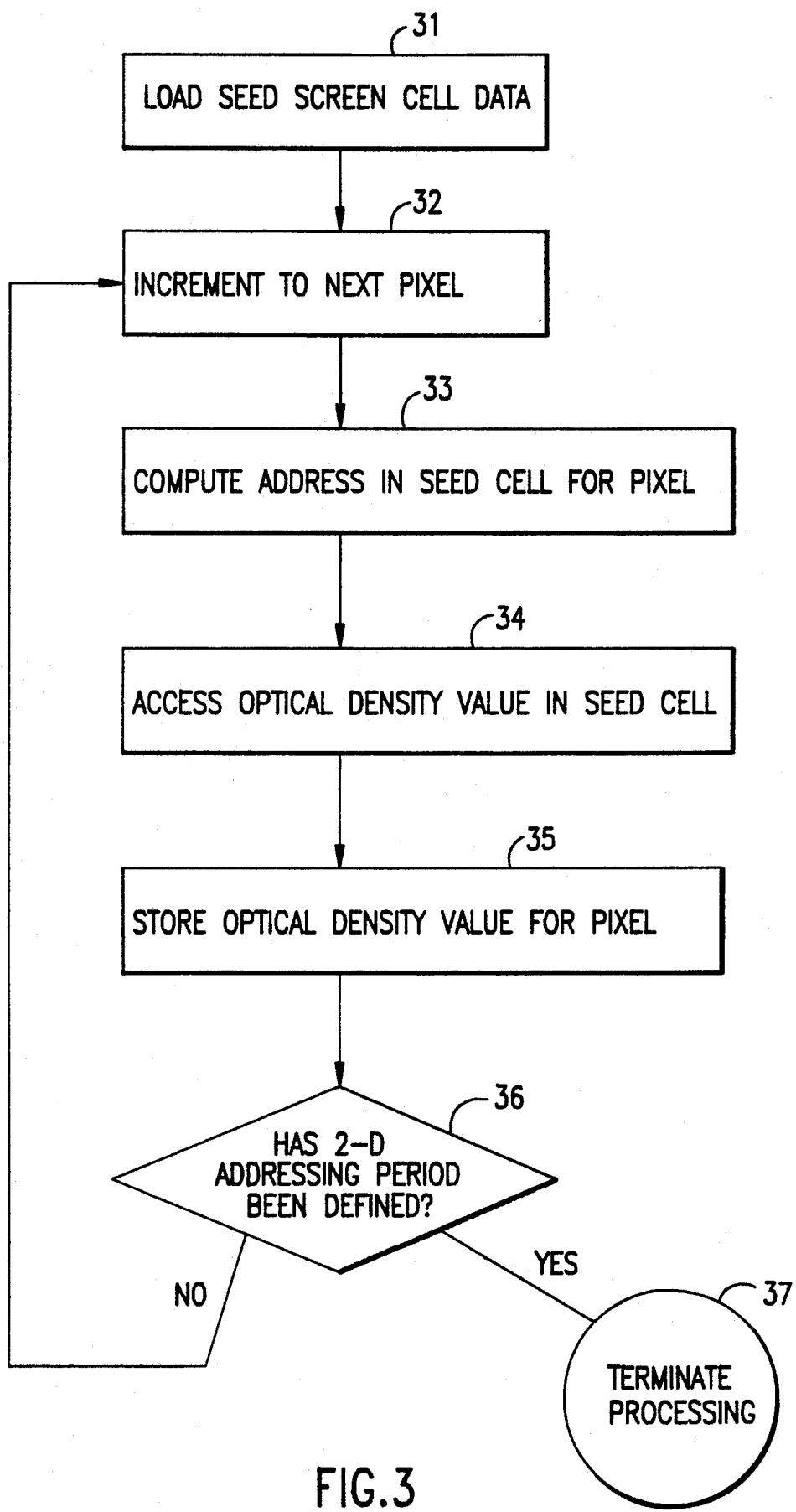
FIG. 3 is a schematic representation of logical flow in calculation of a screen tile.

FIG. 3 sets forth the logic flow for calculating screen optical density values for a screen tile matrix in accordance with a preferred embodiment of the invention. In this embodiment the coordinate system for the screen optical density values is the same as that for the image pixels. Thus in the case of FIG. 1, the coordinate system used has axes X and Y. Initially, in step 31, seed screen cell data (i.e., screen optical density values for locations within the screen cell) are loaded, along with data establishing screen and pixel spacing, and the screen angle. Then the following steps involve establishing the screen optical densities at each image pixel location. For each image pixel location established in step 32, there is computed in step 33 an address in the seed cell matrix where the applicable optical density value is stored. The algorithms for performing the calculation of the seed cell address are those described in Boston (col. 4, lines 35-44). (As described in Boston col. 3, lines 10-13, angle alpha is commonly 90 degrees, and in such cases the algorithms can be somewhat simplified, since sin 90=1, sin(theta+90)=cos theta, and −cos(theta+90)=sin theta.) Once the applicable seed screen cell matrix address is calculated, the optical density value at the address is accessed in step 34 and stored in step 35 as the value for the screen density at the particular image pixel address involved. Once the processing has been achieved for all image pixel addresses in a complete two-dimensional addressing period described above in reference to FIG. 2, the tile is complete and processing is terminated. A sample tile generation program make_byte_map, written in C, is attached hereto and incorporated herein by reference. Typically tiles can be stored on hard disk or other appropriate media for each specific screen frequency on angle and each pixel spacing, and the appropriate tile can be loaded into screen memory as needed.

Figure 4:
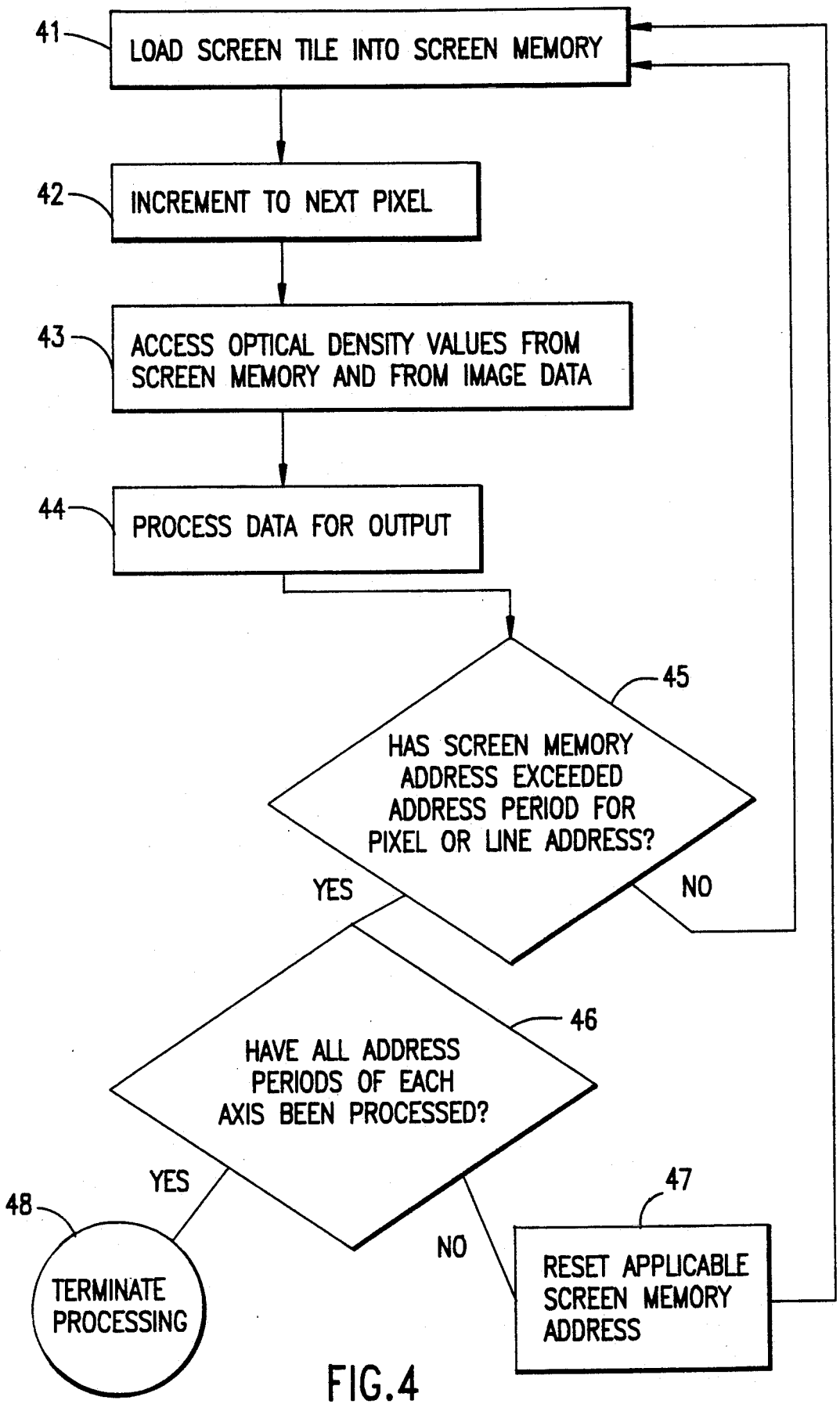
FIG. 4 is a schematic representation of logical flow in screening processing after a screen tile has been calculated.

FIG. 4 shows the logical flow in a preferred embodiment of the invention pursuant to which a screen tile may be used in screening. After the screen tile is loaded into screen memory in accordance with step 41, a pixel address is selected according to step 42, and the optical density values are accessed in step 43 from the image data and from screen memory. These densities are processed in step 44 in accordance with the prior art, as for example, comparing them and generating an output signal. See the Boston patent at column 5, lines 16–34. In the case of halftones, if the image value is greater than the screen value, the output value is typically set to a maximum or black pixel. When a screen memory address has exceeded the address period of its applicable pixel number address or line address, it is reset in step 47, until all address periods of each axis have been processed. It can be seen that this approach to screening can be very fast, because virtually all calculations are performed in advance of screening, and the limiting factors for speed of the screen are in accessing the data and performing the comparison.

Figure 5:
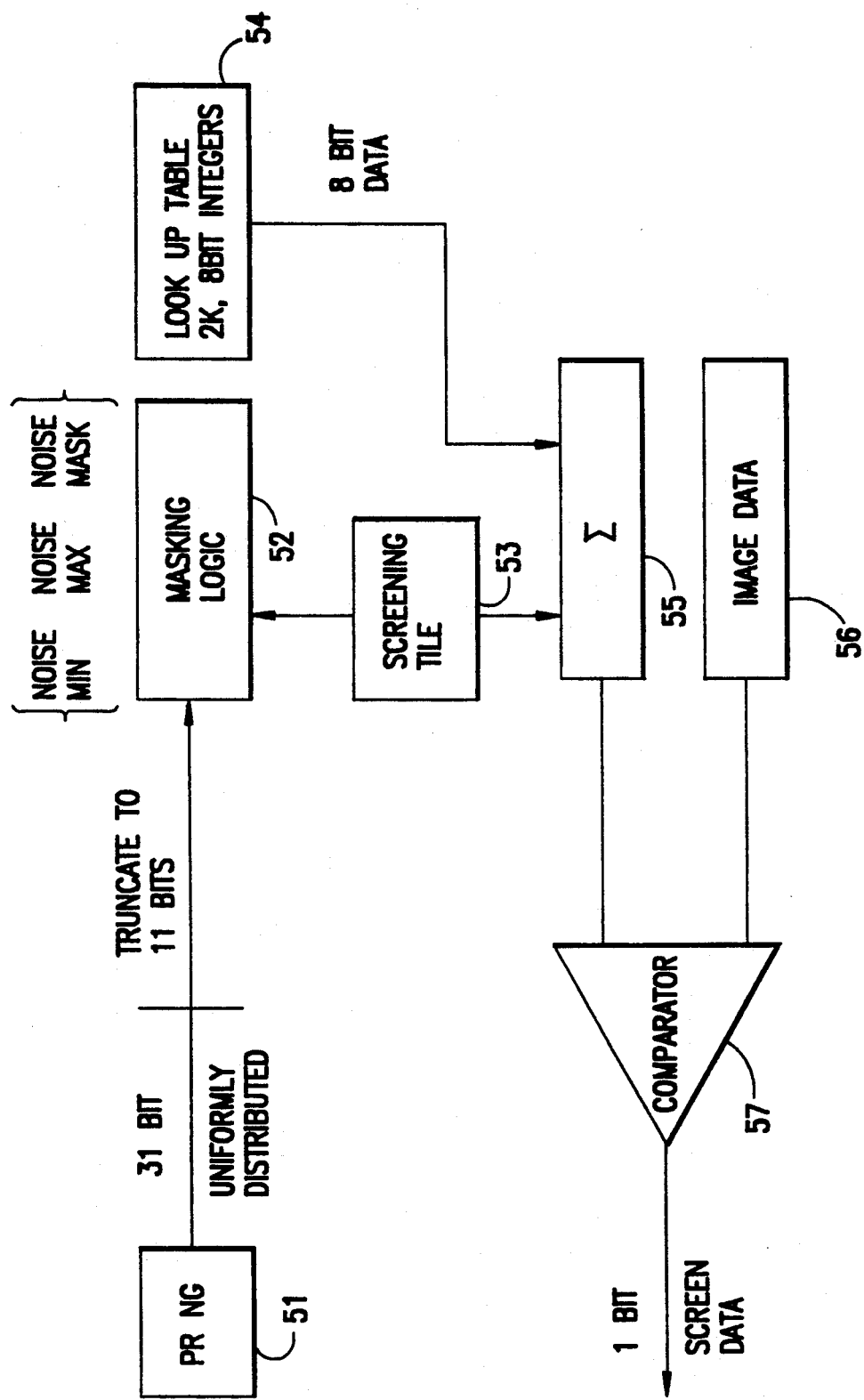
FIG. 5 is block diagram of a screen processing system in accordance with a preferred embodiment of the invention and showing the arrangement for generation, control, and use of noise data.
Figure 7:
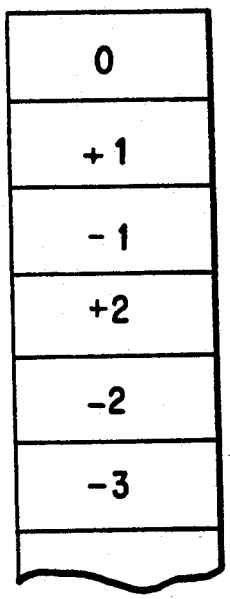
FIG. 7 illustrates a portion of a sample look-up table referenced in FIG. 5.

FIG. 5 shows a preferred embodiment of the invention for dramatically reducing the Moire patterns while avoiding undue degradation of the output. In this embodiment, a noise value is added in summer 55 to each screen density value obtained from the screening tile 53, before the screen density value is provided to the comparator 57 along with the image data 56. The noise value is obtained from a look-up table 54, that is addressed by a pseudorandom number generator 51. The numbers in the look-up table may be chosen to have any desired distribution, for example, uniform (which has been found to produce generally good results) or gaussian, and preferably have an average value of approximately zero to avoid adding a dc density component to the output. They are stored as shown in FIG. 7 in the look-up table in order of increasing absolute value, and are as a matter of convenience limited to signed integers.

Figure 6:
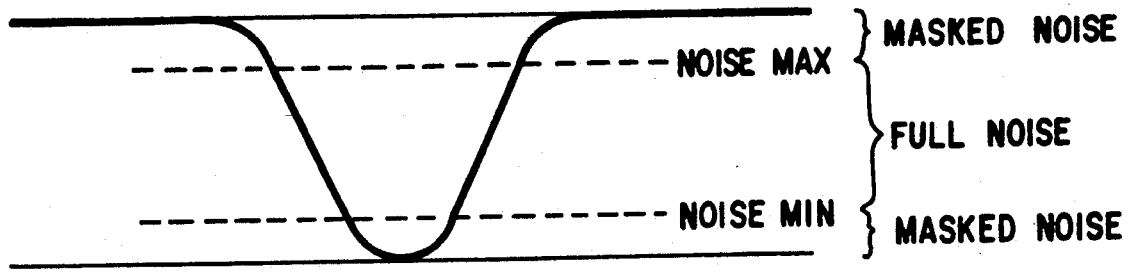
FIG. 6 illustrates maximum and minimum screen density values triggering the mask of noise values.

In accordance with the embodiment of FIG. 5, the noise values summed with the screen values are reduced when the screen values lie outside predetermined limits. That is, as shown in FIG. 6, when the value of a screen density exceeds the value shown as Noise Max, the address of the value is near a border of the screen cell, and in halftone printing it is desirable to avoid placing a dot there. Similarly, when the value of a screen density is below the value shown as Noise Min, the address of the value is near the center of the cell, and if a dot is located there it is desirable to avoid creating a hole in its center. The manner in which the FIG. 5 embodiment reduces the noise value outside these limits is to use the masking logic 52 to sense when the screen value from the screening tile 53 is outside the predetermined limits. In such a case, the 11-bit binary address used to access the look-up table is masked so that only the rightmost 8 bits are used to access the look-up table. Because the look-up table entries are stored in order of increasing absolute value, only the smaller noise values are provided when the screen value is outside Noise Max and Noise Min.

Although FIG. 5 is illustrated to show the addition of the noise value to the screen density value obtained from the screen tile, it is equally possible to incorporate the addition of noise directly into the screen tile matrix itself. In such a case the same basic system as in FIG. 5 can be used to produce a noise value, but the value can be produced at the time of creation of the screen tile matrix, and instead of storing the accessed screen density value from step 34 of FIG. 3 at a given location in the screen tile matrix, there can be stored a modified value equal to the accessed value plus the noise value.

Figure 8:
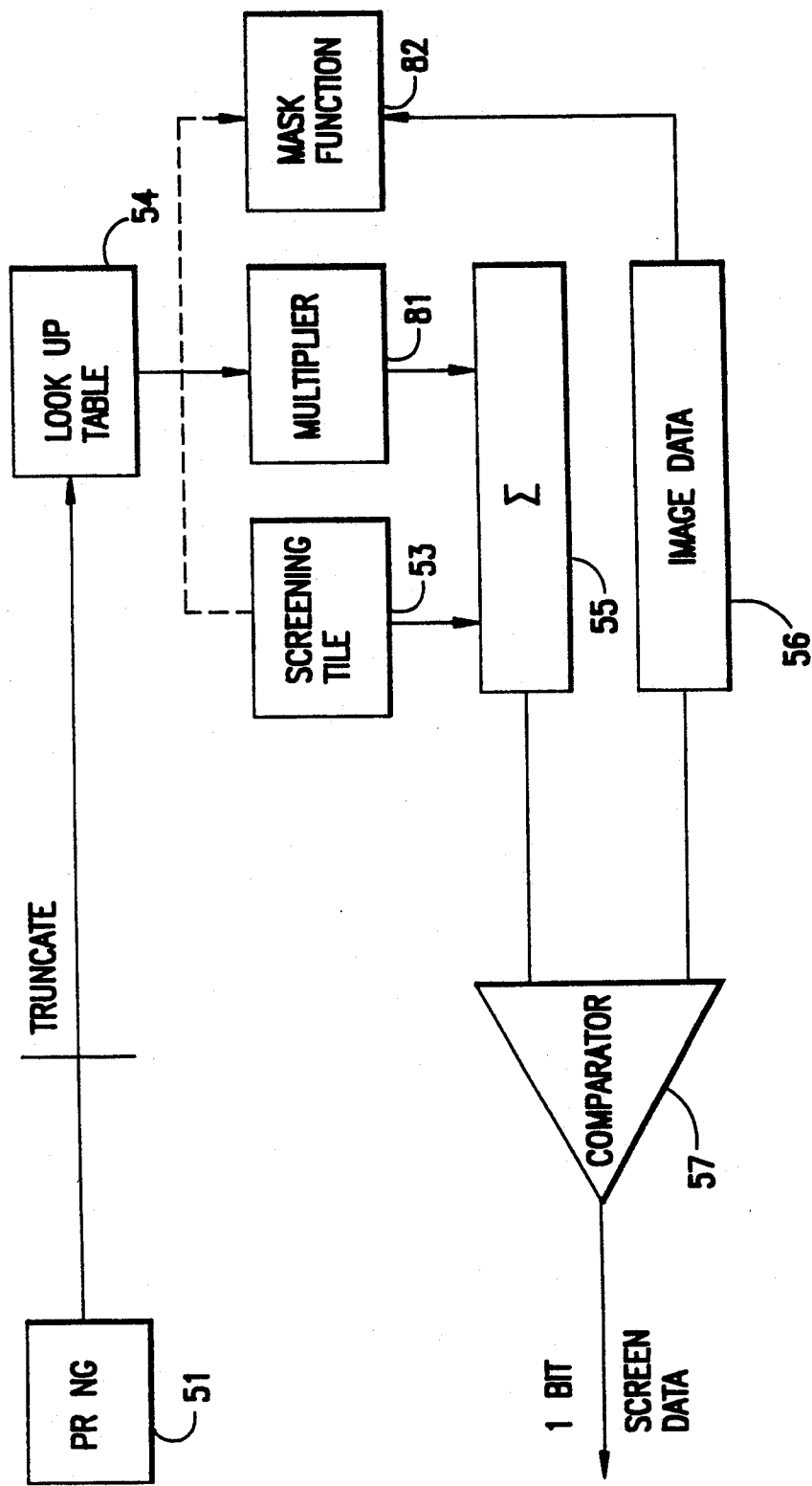
FIG. 8 is a block diagram of a screen processing system in accordance with an alternative preferred embodiment of the invention.

Although a simple thresholding of noise has been described in connection with FIG. 6 as applicable to item 52 of FIG. 5, it is also possible to make the noise input to the summer 55 a function of the magnitude of the image pixel value, as illustrated in FIG. 8. In this case, the image pixel data is used to access an appropriate entry from a look-up table constituting the mask function 82. The mask function is thus a table of scale factors, and the accessed scale factor from the look-up table 82 is multiplied by multiplier 81 with the noise value from look-up table 54 to produce noise that is scaled in accordance with the fixed brightness. This approach can reduce artifacts caused by noise in highlight and shadow regions of the image. A dashed line from screening tile 53 indicates that the mask function 82 may also be made a function of the magnitude of the screen density value. The function can be the simple masking as described in connection with FIG. 6 and item 52 of FIG. 5, or it may be a look-up table as just described in connection with the image data input to the mask function 82.

Although a given method has been described above for associating a screen density value with each image coordinate in the screen tile, it will be appreciated that screen density values may be associated with such coordinates using any suitable method. For example, it is within the scope of the invention to use a physical screen oriented at a desired angle and having a desired mesh and an optical system and digitizer to provide a direct readout of screen density values to be stored in the tile. Similarly, such values, whether calculated or measured, may be modified as desired (using noise or desired filters) to produce different results. Thus screen values in a tile may even be handcrafted.

```
#include      <stdio.h>
#include      "screen3.h"
include      <math.h> double        fmod();
double        drand48();

typedef union
```

```
{
        short   s;
        char    c[2];
}CTOS;
/*
C       Subroutine to fill a two dimensional array with the values
C       encountered in one 2-d addressing sequence, traversing a screen
C       dot in the normal fashion. In this way this byte map can be used
C       for either general rational tangent/magic number screening or
C       for V.A.R. screening.
C       Input variables are the screen cell array, the size of the matrix
C       containing the screen function, the pixel and
C       line deltas, the array to contain the byte map, the maximum size of
C       the bytemap array, the horizontal and
C       vertical addressing period lengths returned by this routine, and the
C       error tolerance for declaring the end of an addressing cycle.
C       If waddr is 'y' it will create a data file bm.dat containing all
C       the actual screen cell addresses in a 2-d addressing period.
*/
void make_byte_map (scarray,Nh,Nv,hpixd,vpixd,hlined,vlined,
                bytemap,hper,vper,filtmap,hperl,vperl,unique_array,
                waddr,filt,filt_type,mult)

char            *scarray;
                        long int        Nh;
                        long int        Nv;
                        float           hpixd;
                        float           vpixd;
                        float           hlined;
                        float           vlined;
                        char            *bytemap;
                        long int        hper;
                        long int        vper;
                        char            filtmap[512][512];
                        long int        hperl;
                        long int        vperl;
                        char            *unique_array;
                        char            *waddr;
                        char            *filt;
                        char            *filt_type;
                        float           mult;
{
        FILE            *bmptr;
        long int        k,h,v,hmax,vmax,hc,vc,scrhit,scrvit,p,l;
        short int       addresses [256];
        CTOS            val;
        short int       unique,temp,extra,ll,lp;
        float           err,scrh,scrv,lshor,lsver,outlim;
        float           rNh,rNv,num,sum;
        long int        seed;
        long int        end,end2;
        double          aa, bb;
        double          invseed;
        double          Dh, Dv, Doff;

Dh = 63.75;
        Dv = 63.75;
        Doff = 127.5;
        scrh = 1;
        scrv = 1;
        rNh = Nh;
        rNv = Nv;
        unique = 0;
        temp = 0;
        extra = 0;
        fprintf (stdout,"bytemap mult is %f\n",mult);
        if (strcmp(waddr,"y")==0)
           {
           bmptr = fopen("bm.dat","w");
           }
```

```
         if (strcmp(filt,"y")==0)
         {
            if (strcmp(filt_type,"a3")==0)
            {
               extra = 2.0;
               num = 9.0;
            }
            else if (strcmp(filt_type,"a5")==0);
            {
               extra = 4.0;
               num = 25.0;
            }
            scrh = scrh - (extra/2.0)*(hpixd + hlined);
            scrh = (float)fmod((double)scrh,(double)rNh);
            if (scrh < 0.50) scrh = rNh + scrh;
            scrv = scrv - (extra/2.0)*(vpixd + vlined);
            scrv = (float)fmod((double)scrv,(double)rNv);
            if (scrv < 0.50) scrv = rNv + scrv; /* .5 corrects for nint used */
         }
         for (l=0; l<Nh*Nv; l++)
            unique_array[l] = 0;

for (l=0; l<vper+extra; l++)
         {
            lshor = scrh;
            lsver = scrv;

for(p=0; p<hper+extra; p++)
            {
               aa = (scrh + drand48()*mult);
               scrhit = nint(aa)%Nh;
               while (aa > Nh)
                  aa = aa - Nh;
               bb = (scrv + drand48()*mult);
               scrvit = nint(bb)%Nv;
               while (bb > Nv)
                  bb = bb - Nv;
               if (strcmp(filt,"y")==0)
               {
                  filtmap[p][l] = scarray[scrvit+ (scrhit)*
               }
               else
/***** compute bytemap directly
                  bytemap[p + l*(hper+extra)] =
                     scarray[scrvit + (scrhit)*Nv];
*****/
                  bytemap[p + l*(hper+extra)] =
               nint( Dh * cos((2*pi/(double)(Nh-1))*a?
                     Dv * cos((2*pi/(double)(Nv-1))*'
                     + Doff);
/*             endif */
               temp = unique_array[scrvit+scrhit*Nv];
               if (temp == 1)
               {
                  temp = 0;
               }
               else
               {
                  unique_array[scrvit+scrhit*Nv] = 1;
                  unique = unique + 1;
               } if (strcmp(waddr,"y")==0)
               {
                  fprintf(bmptr,"%d%,%d\n",scrvit,scrhit);
               }
```

```
            aa = (double)scrh + (double)hpixd;
            scrh = (float)fmod(aa,(double)rNh);
            if (scrh < 0.5) scrh = rNh + scrh;
            aa = (double)scrv + (double)vpixd;
            scrv = (float)fmod(aa,(double)rNv);
            if (scrv<0.5) scrv = rNv + scrv;
        } /*      pixels */ aa = (double)lshor + (double)hlined;
    scrh = fmod(aa,(double)rNh);
    if (scrh <0.5) scrh = rNh + scrh;
    aa = (double)lsver + (double)vlined;
    scrv = fmod(aa,(double)rNv);
    if (scrv<0.5) scrv = rNv + scrv;
    } /* lines */ fprintf(stdout," The addressing sequence contains %d unique screen \
cell addresses\n ",unique);

/*
C   Do filtering if requested - as of 2/23/88 supports only 3x3
C   averaging. Assumes data in filtmap and this section will
C   write filtered data into bytemap. On 2/25/88 added 5x5 averaging
*/
    if (strcmp(filt,"y")==0)
    {
        for( l=0; l<hper; l++)
        {
            for(p=0; p<vper; p++)
            {
                sum = 0;
                for(ll = l; ll <= l+extra; ll++)
                {
                    for(lp=p; lp <= p+extra; lp++)
                    {
                        val.s = 0;
                        val.c[0] = filtmap[lp][ll];
                        sum = sum + val.s;
                    }
                } val.s = nint (sum/num);
                *bytemap = val.c[0];
                bytemap++;
            } /* pixels */
        } /* lines */
    } /* if filt */

}
```

What is claimed is:

1. A method of reproducing an image comprising:
(a) obtaining image optical density values, of the image to be reproduced, at address locations thereof identified by reference to a coordinate system having a pair of axes;
(b) providing in a seed memory screen optical density values at specified locations of a seed screen cell, having a principal axis in an initial orientation parallel to one of the axes of the coordinate system;
(c) choosing screen optical density values, at relative address locations, for a screen tile composed of contiguous replications of the seed screen cell disposed at a predetermined angle to the initial orientation, by determining specified locations of the seed screen cell corresponding to relative address locations of the screen tile, the number of replications occurring along each axis of the coordinate system being at least one and the minimum necessary to cause a corner of the last replication of the seed screen cell to coincide, within a prescribed degree of accuracy, with a relative address location on such axis, the relative address location establishing the address period for such axis;
(d) storing the chosen screen optical density values for the screen tile in a tile memory;
(e) systematically accessing the screen optical density values and processing them with corresponding image optical density values that occur in address locations falling within a given address period of each axis to generate an output for the image portion covered by such locations; and
(f) repeating step (e) until output has been generated for all address periods of each axis.

2. A method of reproducing an image comprising:
(a) obtaining image optical density values of the image to be reproduced, at address locations thereof identified by reference to a coordinate system having a pair of axes;

(b) providing screen optical density values at specified locations of a seed screen cell, having a principal axis in an initial orientation parallel to one of the axes of the coordinate system;

(c) determining screen optical density values, at relative address locations, for a screen tile composed of contiguous replications of the seed screen cell disposed at a predetermined angle to the initial orientation, the number of replications occurring along each axis of the coordinate system being at least one and the minimum necessary to cause a corner of the last replication of the seed screen cell to coincide, within a prescribed degree of accuracy, with a relative address location on such axis, the relative address location establishing the address period for such axis;

(d) storing the screen optical density values for the screen tile in memory;

(e) (i) systematically accessing the screen optical density values, (ii) providing a source of noise data, (iii) adding, to each of the screen optical density values, a noise value, that is a function of the noise data and at least one of the corresponding image optical density value and the screen optical density value, and then (iv) processing the sums of the screen optical density values and the noise values with corresponding image optical density values that occur in address locations falling within a given address period of each axis to generate an output for the image portion covered by such locations; and (f) repeating step (e) until output has been generated for all address periods of each axis.

3. A method according to claim 2, wherein the function reduces the absolute value of the noise data when the screen optical density value falls outside predetermined limits.

4. A method according to claim 3, wherein the step of providing a source of noise data includes:
   (i) providing a look-up table of numbers having a desired distribution and approximately zero average value, arranged in order of increasing absolute value; and
   (ii) randomly addressing entries in the loop-up table to provide noise output data having a desired distribution.

5. A system for reproducing an image in raster form as a series of adjacent pixels disposed along a plurality of adjacent parallel lines comprising:
   (a) image input means for receiving image optical density values, of the image that is to be reproduced, at address locations thereof identified by reference to a coordinate system having a pair of axes;
   (b) screen memory means, for storing screen optical density values of a screen tile, each screen optical density value being in a storage location in screen memory corresponding to a relative address location, the screen tile composed of contiguous replications of a seed screen cell having a principal axis disposed at a predetermined angle to a given axis of the coordinate system, the number of replications occurring along each axis of the coordinate system being at least one and the minimum necessary to cause a corner of the last replication of the screen cell to coincide, within a prescribed degree of accuracy, with a relative address location on such axis, the relative address location establishing the address period for such axis;
   (c) processor means, in communication with the image input means and the screen memory means, for systemically addressing the screen memory means and processing, to generate output, the screen optical density values therein with corresponding optical density values over successive address periods for each axis of the coordinate system, until all image density values have been processed;
   (d) noise generator means, for generating noise output data;
   (e) summing means, in communication with the noise generator means and the processor means, for adding a noise value derived from the noise output data to each screen optical density value addressed by the processor means before such screen optical density value is processed with its corresponding image optical density value; and
   (f) noise processing means, in communication with the noise generator means and the processor means, for processing the noise data as a function of at least one of the corresponding image optical density value and the screen optical density value.

6. A system according to claim 5, wherein the noise processing means includes means for attenuating the absolute value of the noise data as a monotonic decreasing function of the magnitude of the image optical density value.

7. A system for reproducing an image in raster form as a series of adjacent pixels disposed along a plurality of adjacent parallel lines comprising:
   (a) image input means for receiving image optical density values, of the image that is to be reproduced, at address locations thereof identified by reference to a coordinate system having a pair of axes;
   (b) screen memory means, for storing screen optical density values of a screen tile, each screen optical density value being in a storage location in screen memory corresponding to a relative address location, the screen tile composed of contiguous replications of a seed screen cell having a principal axis disposed at a predetermined angle to a given axis of the coordinate system, the number of replications occurring along each axis of the coordinate system being at least one and the minimum necessary to cause a corner of the last replication of the screen cell to coincide, within a prescribed degree of accuracy, with a relative address location on such axis, the relative address location establishing the address period for such axis;
   (c) processor means, in communication with the image input means and the screen memory means, for systematically addressing the screen memory means and processing, to generate output, the screen optical density values therein with corresponding image optical density values over successive address periods for each axis of the coordinate system, until all image optical density values have been processed;
   (d) noise generator means, for generating noise output data, the noise generator means including:
      (i) a look-up table of numbers having a desired distribution and approximately zero average value, arranged in order of increasing absolute value; and (ii) means for randomly addressing entries in the look-up table;

(e) summing means, in communication with the noise generator means and the processor means, for adding a noise value derived from the noise output data to each screen optical density value addressed by the processor means before such screen optical density value is processed with its corresponding image density value.

8. A system according to claim 7, wherein the noise processing means includes means for reducing the absolute value of the noise data when the screen optical density value falls outside predetermined limits.

9. A system for reproducing an image as a halftone formed from a series of adjacent pixels disposed along a plurality of adjacent parallel lines:

input means for receiving image optical density values of the image that is to be reproduced at address locations identified by reference to a coordinate system having a pair of axes;

a seed memory for storing screen optical density values of a seed screen cell that is to be replicated over the image while rotated at a predetermined angle with respect to one of the axes of the coordinate system;

a tile memory for storing screen optical density values, the tile memory having address locations identified by reference to the coordinate system;

computation means for determining the address location of the seed memory that corresponds to a given address of the tile memory;

tile creation means for storing t the given address location of the tile memory a value based on the screen optical density value stored at the corresponding address of the seed memory; and plotting means for accessing the tile memory and processing the values stored therein with corresponding image optical density values.

* * * * *